(12) United States Patent
Sakamoto et al.

(10) Patent No.: US 11,991,545 B2
(45) Date of Patent: May 21, 2024

(54) ARRIVAL RATE ESTIMATION APPARATUS, ARRIVAL RATE ESTIMATION METHOD AND PROGRAM

(71) Applicant: NIPPON TELEGRAPH AND TELEPHONE CORPORATION, Tokyo (JP)

(72) Inventors: Kazumitsu Sakamoto, Musashino (JP); Kenji Suzuki, Musashino (JP); Yohei Katayama, Musashino (JP); Yosuke Fujino, Musashino (JP); Hiroyuki Fukumoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 443 days.

(21) Appl. No.: 17/437,196

(22) PCT Filed: Mar. 2, 2020

(86) PCT No.: PCT/JP2020/008678
§ 371 (c)(1),
(2) Date: Sep. 8, 2021

(87) PCT Pub. No.: WO2020/184253
PCT Pub. Date: Sep. 17, 2020

(65) Prior Publication Data
US 2022/0174520 A1    Jun. 2, 2022

(30) Foreign Application Priority Data
Mar. 12, 2019    (JP) ................................ 2019-044959

(51) Int. Cl.
*H04W 16/18*    (2009.01)
*G06F 17/10*    (2006.01)
(Continued)

(52) U.S. Cl.
CPC .......... *H04W 24/08* (2013.01); *H04B 17/318* (2015.01); *H04L 43/0894* (2013.01)

(58) Field of Classification Search
CPC ...... H04B 7/022; H04B 17/31; H04B 7/0814; H04B 7/2606; H04B 7/155; H04B 17/382;
(Continued)

(56) References Cited

U.S. PATENT DOCUMENTS 6,532,414 B2 *    3/2003    Mintz ...................... G08G 1/01
                                                340/934
7,961,591 B2 *    6/2011    Abedi ................... H04L 5/0044
                                                370/208

(Continued)

OTHER PUBLICATIONS

Forsk, Atoll 3.3.0 Technical Reference Guide for Radio Networks, literature, Mar. 2015.

(Continued)

*Primary Examiner* — Edan Orgad
*Assistant Examiner* — Vanneilian Lalchinthang
(74) *Attorney, Agent, or Firm* — Harness, Dickey & Pierce, P.L.C.

(57) ABSTRACT

An arrival rate estimation device includes an average received power calculation unit that calculates an average received power for each mesh that constitutes an area, with respect to each of a plurality of base stations and each of a plurality of antennas included in each of the base stations and an arrival rate estimation unit that calculates a communication arrival rate by substituting the average received power into a cumulative distribution function of an instantaneous received power value, and based on the calculated communication arrival rate, calculates a communication arrival rate while giving consideration to a site diversity effect and an antenna diversity effect, the cumulative distri- (Continued)

bution function being obtained from a probability density function of an amplitude that instantaneously changes due to Rayleigh fading.

8 Claims, 13 Drawing Sheets

(51) Int. Cl.
*H04B 1/00* (2006.01)
*H04B 7/14* (2006.01)
*H04B 17/318* (2015.01)
*H04L 43/0894* (2022.01)
*H04W 4/02* (2018.01)
*H04W 24/08* (2009.01)

(58) Field of Classification Search
CPC .... G06F 17/5009; G06F 30/20; H04W 16/22; H04W 16/18; H04W 24/04; H04W 52/146; H04W 52/24; H04W 24/08; H04W 52/04; H04W 52/267; H04W 4/023; H04L 43/0894; H04L 1/0015; H04L 1/0009; H04L 1/1867; H04L 25/0222; H04L 1/1845; Y02D 30/70
USPC .......................................... 370/252
See application file for complete search history.

(56) References Cited

U.S. PATENT DOCUMENTS

| | | | | |
|---|---|---|---|---|
| 2006/0083295 A1* | 4/2006 | Ahmed | ............... | H04W 52/04 |
| | | | | 375/222 |
| 2008/0102873 A1* | 5/2008 | Kumar | ............... | H04W 52/146 |
| | | | | 455/69 |
| 2010/0195560 A1* | 8/2010 | Nozaki | ............... | H04B 7/2606 |
| | | | | 370/315 |
| 2014/0113644 A1* | 4/2014 | Burchardt | ............. | H04L 5/0032 |
| | | | | 455/452.1 |
| 2015/0358836 A1* | 12/2015 | Zhu | ............... | H04W 72/0446 |
| | | | | 370/252 |
| 2017/0126445 A1* | 5/2017 | Hamouda | ........... | H04L 27/2666 |
| 2018/0288569 A1* | 10/2018 | Wang | ............... | G01S 1/0426 |
| 2019/0005166 A1* | 1/2019 | Yamauchi | ............... | G06F 30/20 |
| 2019/0357258 A1* | 11/2019 | Hwang | ............. | H04W 74/0833 |

OTHER PUBLICATIONS

Hisato Iwai, Radio Propagation in Mobile Communications-Fundamental Knowledge for Simulations Analysis of Wireless Communications, Corona Publishing Co., Ltd., Nov. 22, 2012, pp. 16-19.

* cited by examiner

Fig. 3

| | (A) | | (B) |
|---|---|---|---|
| BASE STATION # i | AVERAGE RECEIVED POWER OF UPSTREAM COMMUNICATION Rup(i, 1), Rup(i, 2) | BASE STATION # i | AVERAGE RECEIVED POWER OF DOWNSTREAM COMMUNICATION Rdown(i, 1), Rdown(i, 2) |
| BASE STATION #1 | Rup(1, 1), Rup(1, 2) | BASE STATION #1 | Rdown(1, 1), Rdown(1, 2) |
| BASE STATION #2 | Rup(2, 1), Rup(2, 2) | BASE STATION #2 | Rdown(2, 1), Rdown(2, 2) |
| ⋮ | ⋮ | ⋮ | ⋮ |
| BASE STATION # I | Rup(I, 1), Rup(I, 2) | BASE STATION # I | Rdown(I, 1), Rdown(I, 2) |

Fig. 7

| BASE STATION # i | AVERAGE RECEIVED POWER OF UPSTREAM COMMUNICATION Rup (i, 1), Rup (i, 2) | BASE STATIONS INCLUDED IN CALCULATION | | |
|---|---|---|---|---|
| | | FIRST TIME | SECOND TIME | THIRD TIME |
| BASE STATION #1 | Rup (1, 1), Rup (1, 2) | ] | ] | ] |
| BASE STATION #4 | Rup (4, 1), Rup (4, 2) | ] | ] | ] |
| BASE STATION #3 | Rup (3, 1), Rup (3, 2) | | | ] |
| BASE STATION #2 | Rup (2, 1), Rup (2, 2) | | | |
| ⋮ | ⋮ | | | |

Fig. 10

| MARGIN x (dB) FROM RECEPTION SENSITIVITY | ONE BASE STATION | TWO BASE STATIONS | THREE BASE STATIONS | FOUR BASE STATIONS |
|---|---|---|---|---|
| ⋮ | ⋮ | ⋮ | ⋮ | ⋮ |
| 20 | UNNECESSARY | UNNECESSARY | UNNECESSARY | UNNECESSARY |
| 15 | NECESSARY | UNNECESSARY | UNNECESSARY | UNNECESSARY |
| 10 | NECESSARY | UNNECESSARY | UNNECESSARY | UNNECESSARY |
| 5 | NECESSARY | NECESSARY | UNNECESSARY | UNNECESSARY |
| 0 | NECESSARY | NECESSARY | NECESSARY | UNNECESSARY |

ARRIVAL RATE ESTIMATION APPARATUS, ARRIVAL RATE ESTIMATION METHOD AND PROGRAM

CROSS-REFERENCE TO RELATED APPLICATIONS

This application is a 371 U.S. National Phase of International Application No. PCT/JP2020/008678 filed on Mar. 2, 2020, which claims priority to Japanese Application No. 2019-044959 filed on Mar. 12, 2019. The entire disclosures of the above applications are incorporated herein by reference.

TECHNICAL FIELD

The present invention relates to an arrival rate estimation device, an arrival rate estimation method, and a program.

BACKGROUND ART

Due to the development of IoT (Internet of Things) technologies, connecting things (hereinafter referred to as "IoT devices" or "terminals") that include various sensors and communication functions to a network and performing remote data collection, remote control of IoT devices, and the like is becoming increasingly popular every year. Also, in recent years, LPWA (Low Power Wide Area network) is attracting attention as a wireless communication method for IoT devices. Examples of the LPWA include wireless communication methods such as LoRaWAN and Sigfox in which unlicensed bands (frequency bands for which a radio station license is unnecessary) are used and LTE-M (Long Term Evolution for Machines) and NB (Narrow Band)-IoT in which licensed bands (frequency bands for which a radio station license is necessary) are used.

In many cases, IoT devices are fixedly installed at specific locations and used in such a state. On the other hand, radio wave propagation is highly dependent on locations. Accordingly, if an IoT device is installed in a dead zone in which received power of radio waves from base stations is low, the IoT device may be in a state of being unable to communicate for a long period of time. Therefore, it is important to perform station installation design such that sufficient received power can be ensured at a location at which an IoT device is to be installed.

A radio wave propagation simulator is commonly used to estimate an area in which communication can be performed when a base station is arranged in station installation design. In a radio wave propagation simulator for outdoor evaluation, 3D (three-dimensional) map data (data regarding topographical height, building height, land use classification, etc.) is used, and an average received power is calculated based on a radio wave propagation model such as the Okumura-Hata model (see NPL 1, for example). An average received power is commonly calculated with consideration given to attenuation (long-section change) corresponding to a distance from a base station and a local change in received power (short-section change) due to an interrupting object such as a building. Also, the average received power is calculated for each very small mesh (e.g., meshes provided at intervals of 5 m) in an area around the base station. A station installation designer selects a station installation location using a spatial distribution of the average received power calculated using the radio wave propagation simulator.

Incidentally, radio waves that are composited and received at an actual reception point arrive at the reception point via a plurality of paths after having been reflected and diffracted by buildings and the like and passed through buildings and the like. Accordingly, a relationship between phases of the arriving radio waves changes due to movement of a vehicle, a person, etc., swaying of a tree, and the like in the surrounding area. Therefore, received power of the radio waves instantaneously changes at the actual reception point. Such instantaneous changes are called Rayleigh fading.

As a method for calculating an average received power while giving consideration to the long-section change, the short-section change, and instantaneous changes, there is a method for analyzing radio wave propagation using a ray trace method. In the method for analyzing radio wave propagation using the ray trace method, a plurality of signals that have arrived at a reception point from a transmission point via a plurality of paths are calculated and are composited into a complex number based on a relationship between phases of the signals, to calculate an instantaneous received power value. However, reliability of the phases of the signals that have different paths and are calculated using the ray trace method is assured only when accuracy of building information and positions of the transmission point and the reception point is about $1/10$ or less of the wavelength. Therefore, a radio wave propagation simulator that uses the ray trace method commonly does not composite signals into a complex number but composites signals of respective paths in a power dimension to calculate an average received power by averaging instantaneous changes. Note that in wireless communication, use of mobile terminals is commonly assumed and estimation of an exact instantaneous received power value at a specific position is unnecessary, and therefore, an average received power is used in station installation design.

CITATION LIST

Non Patent Literature

[NPL 1] "Atoll 3.3.0 Technical Reference Guide for Radio Networks", Forsk, AT330_TRR_E1, p. 57-p. 121, March 2015

[NPL 2] Iwai Hisato, "Radio Wave Propagation in Mobile Communication-Basic Knowledge for Wireless Communication Simulation-", CORONA PUBLISHING CO., LTD., p. 16-p. 19, Nov. 22, 2012

SUMMARY OF THE INVENTION

Technical Problem

As described above, IoT devices are usually fixedly installed at specific locations. Therefore, in order to perform efficient station installation design (e.g., that minimizes cost) while ensuring arrival of radio waves at a location at which an IoT device is to be installed, merely estimating an average received power is insufficient, and it is necessary to estimate an arrival rate of radio waves of a case where the influence of instantaneous changes is taken into consideration. The "arrival rate of radio waves" described herein refers to the probability of received power of desired waves being greater than or equal to a reception sensitivity of a receiving station.

In the LPWA, a signal that has been transmitted from a terminal is commonly received and demodulated by a plurality of base stations in upstream communication from the terminal to the base stations. Successfully received signals are transmitted to a host network server. Then, out of the successfully received signals, a signal that has the highest received power is selected by the network server (site diversity). Also, in a case where a base station includes a plurality of antennas, the signal transmitted from the terminal is received and demodulated by the plurality of antennas. Successfully received signals are transmitted to the host network server. Then, out of the successfully received signals, a signal that has the highest received power is selected by the network server (antenna diversity). Downstream communication from the base stations to the terminal is performed using a base station and an antenna that have been selected in immediately preceding upstream communication to ensure high communication quality. Therefore, an arrival rate needs to be estimated while taking these diversity effects into consideration.

The present invention was made in view of the above circumstances, and has an object of providing a technology for estimating an arrival rate of radio waves with higher accuracy.

Means for Solving the Problem

An aspect of the present invention is an arrival rate estimation device that includes: an average received power calculation unit configured to calculate an average received power for each mesh that constitutes an area, with respect to each of a plurality of base stations and each of a plurality of antennas that are included in each of the base stations; and an arrival rate estimation unit configured to calculate a communication arrival rate by substituting the average received power into a cumulative distribution function of an instantaneous received power value, and based on the calculated communication arrival rate, calculate a communication arrival rate while giving consideration to a site diversity effect and an antenna diversity effect, the cumulative distribution function being obtained from a probability density function of an amplitude that instantaneously changes due to Rayleigh fading.

An aspect of the present invention is the arrival rate estimation device described above, wherein the arrival rate estimation unit calculates an influence of instantaneous changes in received power using an analytic expression.

An aspect of the present invention is the arrival rate estimation device described above, wherein the average received power calculation unit calculates an average received power of upstream communication and an average received power of downstream communication, and the arrival rate estimation unit calculates a joint probability of an arrival rate in upstream communication and an arrival rate in downstream communication.

An aspect of the present invention is the arrival rate estimation device described above, further including a repetition determination unit, wherein the average received power calculation unit sorts the base stations in descending order of calculated values of average received power, the arrival rate estimation unit repeatedly calculates an arrival rate while gradually increasing the number of base stations that are taken into consideration, in descending order of power, and the repetition determination unit ends repeated processing if a calculated arrival rate is greater than or equal to a target value or a change from an arrival rate that has been calculated in immediately preceding repeated processing is no greater than a target convergence value.

An aspect of the present invention is the arrival rate estimation device described above, further including an exact calculation execution determination table creation unit and an exact calculation execution determination unit, wherein the average received power calculation unit sorts the base stations in descending order of calculated values of average received power, the exact calculation execution determination table creation unit creates an exact calculation execution determination table for determining whether or not exact calculation of an arrival rate needs to be performed, based on average received powers and the number of base stations, and the exact calculation execution determination unit refers to the exact calculation execution determination table to determine whether or not exact calculation needs to be performed.

An aspect of the present invention is the arrival rate estimation device described above, further including a grouping unit, wherein the average received power calculation unit sorts the base stations in descending order of calculated values of average received power, the grouping unit groups adjacent meshes if a difference between the adjacent meshes in average received power of higher-order base stations is small, and the arrival rate estimation unit calculates an arrival rate for a mesh of the grouped meshes while giving consideration to an influence of instantaneous changes and diversity effects, and takes the calculated arrival rate to be an arrival rate with respect to another mesh of the grouped meshes.

An aspect of the present invention is an arrival rate estimation method including: an average received power calculation step of calculating an average received power for each mesh that constitutes an area, with respect to each of a plurality of base stations and each of a plurality of antennas that are included in each of the base stations; and an arrival rate estimation step of calculating a communication arrival rate by substituting the average received power into a cumulative distribution function of an instantaneous received power value, and based on the calculated communication arrival rate, calculating a communication arrival rate while giving consideration to a site diversity effect and an antenna diversity effect, the cumulative distribution function being obtained from a probability density function of an amplitude that instantaneously changes due to Rayleigh fading.

An aspect of the present invention is a program for causing a computer as the arrival rate estimation device described above.

Effects of the Invention

According to the present invention, an arrival rate of radio waves can be estimated with higher accuracy.

BRIEF DESCRIPTION OF DRAWINGS

FIG. 3 is a diagram showing average received powers calculated by an average received power calculation unit 11 of the arrival rate estimation device 1a according to the first embodiment of the present invention.

FIG. 7 is a diagram showing average received powers calculated by an average received power calculation unit 11 of the arrival rate estimation device 1b according to the second embodiment of the present invention.

FIG. 10 is a diagram showing an example of an exact calculation execution determination table that is used by the arrival rate estimation device 1c according to the third embodiment of the present invention.

DESCRIPTION OF EMBODIMENTS

The following describes embodiments of the present invention in detail with reference to the drawings.

First Embodiment

The following describes a first embodiment of the present invention.

[Functional Configuration of Arrival Rate Estimation Device]

The following describes a functional configuration of an arrival rate estimation device 1a according to the present embodiment.

Figure 1:
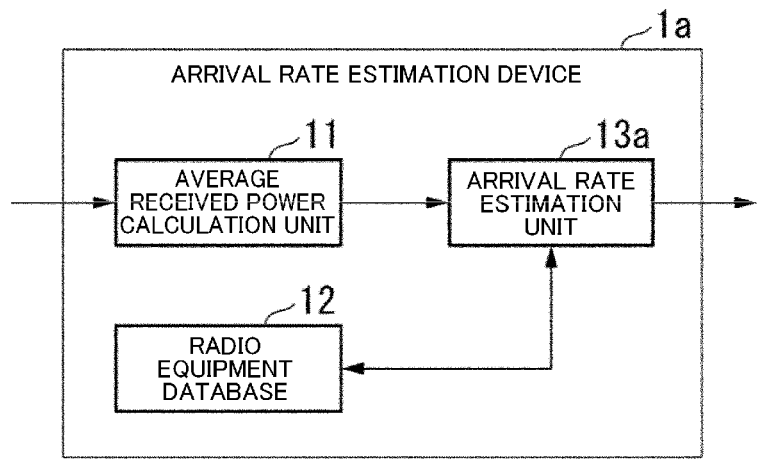
FIG. 1 is a block diagram showing a functional configuration of an arrival rate estimation device 1a according to a first embodiment of the present invention.

FIG. 1 is a block diagram showing the functional configuration of the arrival rate estimation device 1a according to the first embodiment of the present invention. As shown in FIG. 1, the arrival rate estimation device 1a includes an average received power calculation unit 11, a radio equipment database 12, and an arrival rate estimation unit 13a.

The average received power calculation unit 11 corresponds to a common radio wave propagation simulator. The average received power calculation unit 11 imports map data (data regarding topographical height, building height, land use classification, etc.) from an external device or the like. The average received power calculation unit 11 divides map data regarding an area that is set by a designer into very small meshes (e.g., meshes provided at intervals of 5 m). Then, the average received power calculation unit 11 calculates an average received power of radio waves transmitted from a base station in downstream communication with respect to each mesh (i.e., a virtual terminal that is assumed to be installed at the position corresponding to the mesh). Similarly, the average received power calculation unit 11 calculates an average received power of radio waves transmitted from each mesh to the base station in upstream communication.

The radio equipment database 12 holds parameters regarding radio equipment such as the number of antennas and a reception sensitivity of each base station.

The arrival rate estimation unit 13a calculates an arrival rate of radio waves while giving consideration to the influence of instantaneous changes and diversity effects with respect to average received powers calculated by the average received power calculation unit 11 for upstream communication and downstream communication between each base station and each mesh.

[Arrival Rate Estimation]

The following describes processing for estimating an arrival rate of radio waves.

Figure 2:
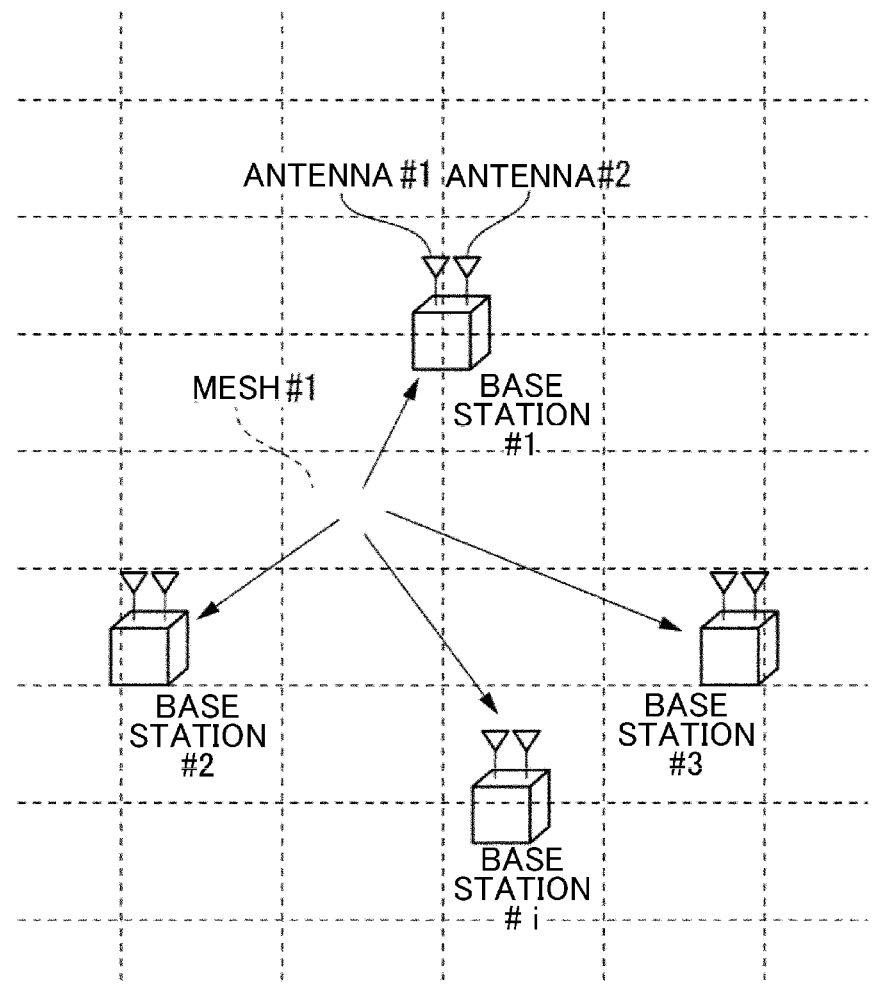
FIG. 2 is a diagram for describing arrival rate estimation processing performed by the arrival rate estimation device 1a according to the first embodiment of the present invention.

FIG. 2 is a diagram for describing arrival rate estimation processing that is performed by the arrival rate estimation device 1a according to the first embodiment of the present invention.

Here, processing for estimating an arrival rate of radio waves at the position of a mesh #1 shown in FIG. 2 will be described as an example. Assume that the number of base stations located in the area shown in FIG. 2 is I. Note that FIG. 2 only shows four base stations, and illustration of the other base stations is omitted. Assume that each base station shown in FIG. 2 includes two antennas.

Here, an average received power at an antenna #j (j=1 to 2) of a base station #i (i=1 to I) in upstream communication is represented as $R_{up}(i,j)$. Also, an average received power of downstream communication from the antenna #j of the base station is represented as $R_{down}(i,j)$.

FIG. 3 is a diagram showing average received powers calculated by the average received power calculation unit 11 of the arrival rate estimation device 1a according to the first embodiment of the present invention. With respect to each base station, the average received power calculation unit 11 calculates $R_{up}(i,j)$ shown in FIG. 3(A), which is an average received power of upstream communication between the base station #i and the mesh #1. Also, with respect to each base station, the average received power calculation unit 11 calculates $R_{down}(i,j)$ shown in FIG. 3(B), which is an average received power of downstream communication between the base station #i and the mesh #1.

The following describes arrival rate estimation processing performed by the arrival rate estimation unit 13a. First, upstream communication will be described. The arrival rate estimation unit 13a acquires information indicating the number of antennas and the reception sensitivity of the base station #i from the radio equipment database 12. Then, the arrival rate estimation unit 13a calculates, as an upstream communication arrival rate $P_{up}(i,j)$ of the antenna #j of the base station a probability of an instantaneous received power value being greater than or equal to the reception sensitivity $T_{up}(i)$ of the base station #i in a case where the influence of instantaneous changes due to Rayleigh fading is taken into consideration with respect to the average received power $R_{up}(i,j)$ of upstream communication.

A Monte Carlo simulation method is a simple method for calculating an instantaneous received power value. In the Monte Carlo simulation method, an instantaneous received power value is calculated by compositing radio waves that arrive at the antenna #j of the base station #i via a plurality of paths, while randomly changing phases of the radio waves. By repeating this calculation, a cumulative distribution function (CDF) of the instantaneous received power value is generated. However, this calculation is usually repeated a huge number (e.g., at least tens of thousands) of times. Accordingly, there is an issue in that the calculation takes an enormous amount of time. Therefore, in the present embodiment, instantaneous changes due to Rayleigh fading are expressed using an analytic expression described below to obtain a CDF of the instantaneous received power value without performing Monte Carlo simulation.

When the amplitude of a received signal is represented by a, a probability density function (PDF) of the amplitude a that instantaneously changes due to Rayleigh fading can be expressed by the following Expression (1) using the average received power $R_{up}(i,j)$ (see NPL 2).

$$p(a) = \frac{a}{R_{up}(i,j)} \exp\left(-\frac{a^2}{2R_{up}(i,j)}\right) \quad (1)$$

By converting this to a PDF of power $r=a^2$, a PDF of the instantaneous received power value can be expressed by the following Expression (2).

$$p(r) = p(a)\frac{da}{dr} = \frac{1}{2R_{up}(i,j)} \exp\left(-\frac{r}{2R_{up}(i,j)}\right) \quad (2)$$

By calculating a CDF from the above PDF, the CDF can be expressed by the following Expression (3).

$$CDF(y) = \int_0^y p(r)dr = 1 - \exp\left(-\frac{y}{2R_{up}(i,j)}\right) \quad (3)$$

The upstream communication arrival rate $P_{up}(i,j)$ of the antenna #j of the base station #i can be calculated by inputting the reception sensitivity $T_{up}(i)$ of the base station #i to y in Expression (3). The upstream communication arrival rate $P_{up}(i,j)$ of the antenna #j of the base station #i can be expressed by the following Expression (4).

$$P_{up}(i,j) = CDF(T_{up}(i)) = 1 - \exp\left(-\frac{T_{up}(i)}{ZR_{up}(i,j)}\right) \quad (4)$$

Thus, as a result of instantaneous changes due to Rayleigh fading being expressed using the analytic expression, the upstream communication arrival rate $P_{up}(i,j)$ of the antenna #j of the base station #i can be calculated in a short period of time without performing Monte Carlo simulation.

Next, an upstream communication arrival rate $P'_{up}(i)$ of the base station #i can be expressed by the following Expression (5) with consideration given to an antenna diversity effect that is achieved when a signal that has the highest received power is selected from signals successfully received by respective antennas.

$$P'_{up}(i) = 1 - (1 - P_{up}(i,1))(1 - P_{up}(i,2)) \quad (5)$$

Furthermore, an upstream communication arrival rate $P''_{up}$ can be expressed by the following Expression (6) with consideration given to a site diversity effect that is achieved when a signal that has the highest received power is selected from signals successfully received by a plurality of base stations.

$$P''_{up} = 1 - (1 - P'_{up}(1))(1 - P'_{up}(2)) \ldots (1 - P'_{up}(I)) \quad (6)$$

The following describes calculation of an arrival rate in a case where a communication sequence of a series of upstream communication and downstream communication is assumed. Here, a case where upstream communication and downstream communication are each performed once is assumed. That is, a case will be described where an arrival rate is estimated in a situation in which there is a mechanism for selecting a base station and an antenna such that high communication quality is ensured in a series of upstream communication and downstream communication. An example of the case where upstream communication and downstream communication are each performed once is a case where an IoT device uploads acquired sensor data, and a base station transmits an Ack (Acknowledge) signal to the IoT device in reply.

The arrival rate estimation unit 13a acquires the number of antennas of the base station #i and the reception sensitivity of a terminal from the radio equipment database 12. The arrival rate estimation unit 13a calculates, as a downstream communication arrival rate $P_{down}(i,j)$ of the antenna #j of the base station a probability of an instantaneous received power value being greater than or equal to the reception sensitivity $T_{down}$ of the terminal in a case where the influence of instantaneous changes due to Rayleigh fading is taken into consideration with respect to the average received power $R_{down}(i,j)$ of downstream communication. Similarly to the estimation of an arrival rate in upstream communication, as a result of instantaneous changes due to Rayleigh fading being expressed using an analytic expression, the downstream communication arrival rate $P_{down}(i,j)$ of the antenna #j of the base station #i can be calculated in a short period of time without performing Monte Carlo simulation.

A CDF of power in downstream communication, which instantaneously changes due to Rayleigh fading, can be expressed by the following Expression (7) using the average received power $R_{down}$).

$$CDF(y) = 1 - \exp\left(-\frac{y}{2R_{down}(i,j)}\right) \quad (7)$$

The downstream communication arrival rate $P_{down}(i,j)$ of the antenna #j of the base station #i can be calculated by inputting the reception sensitivity $T_{down}$ of the terminal to y in Expression (7). The downstream communication arrival rate $P_{down}(i,j)$ of the antenna #j of the base station #i can be expressed by the following Expression (8).

$$P_{down}(i,j) = CDF(T_{down}) = 1 - \exp\left(-\frac{T_{down}}{2R_{down}(i,j)}\right) \quad (8)$$

A downstream communication arrival rate $P'_{down}(i)$ of the base station #i can be expressed by the following Expression (9) with consideration given to the antenna diversity effect.

$$P'_{down}(i) = 1 - (1 - P_{down}(i,1))(1 - P_{down}(i,2)) \quad (9)$$

A joint probability $P_{joint}(i)$ of the arrival rate in upstream communication and the arrival rate in downstream communication with respect to the base station #i can be expressed by the following Expression (10).

$$P_{joint}(i) = P'_{up}(i) \times P'_{down}(i) \qquad (10)$$

Furthermore, when the site diversity effect is taken into consideration, a joint probability $P'_{joint}$ of the arrival rate in upstream communication and the arrival rate in downstream communication can be expressed by the following Expression (11).

$$P'_{joint} = 1 - (1 - P_{joint}(1))(1 - P_{joint}(2)) \ldots (1 - P_{joint}(I)) \qquad (11)$$

[Operations of Arrival Rate Estimation Device]

The following describes operations of the arrival rate estimation device 1a in the arrival rate estimation processing.

Figure 4:
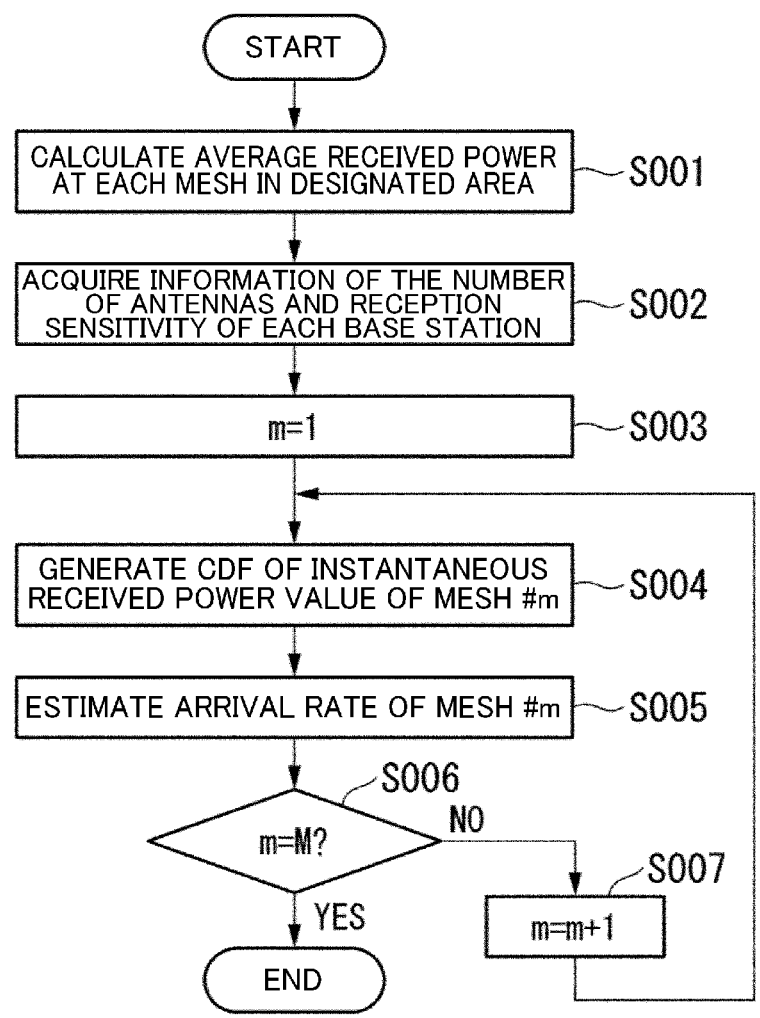
FIG. 4 is a flowchart showing operations of the arrival rate estimation device 1a according to the first embodiment of the present invention.

FIG. 4 is a flowchart showing the operations of the arrival rate estimation device 1a according to the first embodiment of the present invention. Note that here, estimation of an arrival rate in upstream communication will be described.

The average received power calculation unit 11 divides map data regarding an area that is designated by a designer into very small meshes. Here, the number of meshes is M. The average received power calculation unit 11 calculates an average received power of upstream communication from each of the divided meshes to each base station (step S001).

The arrival rate estimation unit 13a acquires information indicating the number of antennas and the reception sensitivity of each base station from the radio equipment database 12 (step S002).

1 is substituted for a variable m for identifying a mesh (step S003).

The arrival rate estimation unit 13a generates a CDF of the instantaneous received power value with respect to the mesh #m in a case where the influence of instantaneous changes due to Rayleigh fading is taken into consideration, by using the average received power with respect to the mesh #m (step S004).

Based on the generated CDF, the arrival rate estimation unit 13a calculates a probability of the instantaneous received power value being greater than or equal to the reception sensitivity of the base station. The arrival rate estimation unit 13a calculates an upstream communication arrival rate of the mesh #m while giving consideration to the antenna diversity effect and the site diversity effect (step S005).

Whether or not the variable m is equal to the number M of meshes is determined (step S006). If the variable m is not equal to the number M of meshes (step S006—No), 1 is added to the variable m (step S007), and the arrival rate estimation device proceeds to step S004. On the other hand, if the variable m is equal to the number M of meshes (step S006—Yes), the operations of the arrival rate estimation device 1a shown in the flowchart of FIG. 4 end.

As described above, the arrival rate estimation device 1a according to the first embodiment of the present invention includes the average received power calculation unit 11 and the arrival rate estimation unit 13a that calculates a communication arrival rate. The average received power calculation unit 11 calculates an average received power for each mesh constituting an area, with respect to each of a plurality of base stations and each of a plurality of antennas included in each of the base stations. The arrival rate estimation unit 13a calculates a communication arrival rate by substituting the average received power into a cumulative distribution function of the instantaneous received power value, and based on the calculated communication arrival rate, calculates a communication arrival rate while giving consideration to the site diversity effect and the antenna diversity effect, the cumulative distribution function being obtained from a probability density function of the amplitude that instantaneously changes due to Rayleigh fading.

With this configuration, the arrival rate estimation device 1a according to the first embodiment of the present invention can estimate an arrival rate of radio waves with higher accuracy.

Second Embodiment

The following describes a second embodiment of the present invention.

In the first embodiment described above, a case has been described where an arrival rate is calculated with consideration given to the site diversity effect of all base stations. In contrast, a case will be described in the second embodiment in which an arrival rate is calculated with only base stations that greatly contribute to the arrival rate taken to be targets of calculation. The following only describes differences from the first embodiment. Note that here, estimation of an arrival rate in upstream communication will be described.

[Configuration of Arrival Rate Estimation Device]

The following describes a functional configuration of an arrival rate estimation device 1b according to the present embodiment.

Figure 5:
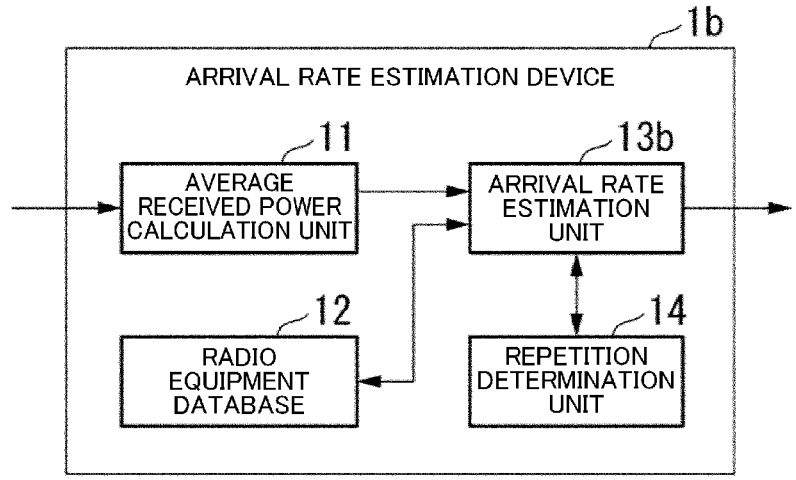
FIG. 5 is a block diagram showing a functional configuration of an arrival rate estimation device 1b according to a second embodiment of the present invention.

FIG. 5 is a block diagram showing the functional configuration of the arrival rate estimation device 1b according to the second embodiment of the present invention. As shown in FIG. 5, the arrival rate estimation device 1b includes the average received power calculation unit 11, the radio equipment database 12, an arrival rate estimation unit 13b, and a repetition determination unit 14. As described above, the functional configuration differs from that of the arrival rate estimation device 1a according to the first embodiment in that the repetition determination unit 14 is provided.

The arrival rate estimation unit 13b sorts base stations in descending order of values of average received power, based on the average received power $R_{up}(i,j)$ calculated by the average received power calculation unit 11. Then, the arrival rate estimation unit 13b repeatedly calculates an arrival rate while gradually increasing base stations for which calculation is performed in the estimation of the arrival rate, in descending order of the average received power. Then, if the repetition determination unit 14 has determined to end repeated processing, the arrival rate estimation unit 13b ends the repeated processing. Then, the arrival rate estimation unit 13b outputs a calculated arrival rate at that point in time as an arrival rate at the position of the mesh for which calculation was performed.

The repetition determination unit 14 determines to end the repeated processing if the calculated arrival rate is greater than or equal to a target value in station installation design or an amount of change from an arrival rate that has been calculated in immediately preceding repeated processing is no greater than a predetermined value.

[Arrival Rate Estimation]

The following describes processing for estimating an arrival rate of radio waves.

Figure 6:
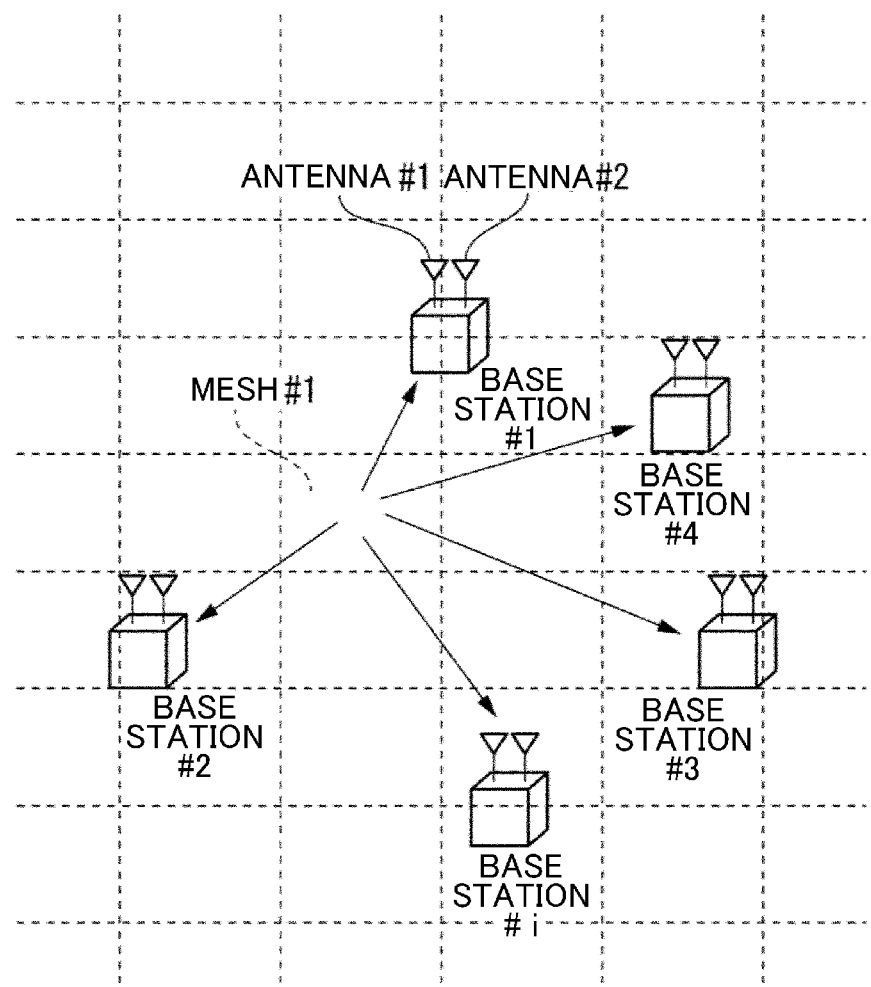
FIG. 6 is a diagram for describing arrival rate estimation processing performed by the arrival rate estimation device 1b according to the second embodiment of the present invention.

FIG. 6 is a diagram for describing arrival rate estimation processing that is performed by the arrival rate estimation device 1b according to the second embodiment of the present invention.

Here, estimation of an arrival rate of radio waves at the position of a mesh #1 shown in FIG. 6 will be described as an example. Assume that the number of base stations located in the area shown in FIG. 6 is I. Note that FIG. 6 only shows five base stations, and illustration of the rest of the base stations is omitted. Assume that each base station shown in FIG. 6 includes two antennas.

First, a designer determines a target value $P_{target}$ (e.g., 0.9) of the arrival rate in station installation design and a target convergence value $\Delta P_{target}$ (e.g., 0.02) of changes in the arrival rate in the repeated processing. The determined values of $P_{target}$ and $\Delta P_{target}$ are set in the repetition determination unit 14.

The average received power calculation unit 11 calculates an average received power $R_{up}(i,j)$ at the antenna #j (j=1 to 2) of the base station #i (i=1 to I).

The arrival rate estimation unit 13b acquires information indicating the number of antennas and the reception sensitivity of the base station #i from the radio equipment database 12. Next, the arrival rate estimation unit 13b sorts the base stations in descending order of values of $R_{up}(i,j)$. Here, assume that in the list shown in FIG. 7, the base stations are arranged from the top in descending order of average received power, for example. Note that the average received power is calculated for each of the two antennas included in each base station. The arrival rate estimation unit 13b may sort the base stations using a larger value of respective average received powers of the two antennas of each base station as a representative value of the base station, or using an average value of the respective average received powers of the two antennas.

The following describes a case where base stations for which calculation of the arrival rate is performed is increased one by one each time the repeated processing is performed. That is, in the k-th repeated processing, calculation of the arrival rate is performed for k base stations (higher-order base stations) that are selected in descending order of values of average received power. Note that the number of base stations that are increased each time the repeated processing is performed is not limited to one, and may also be two, or may also be exponentially increased such as one, two, four, . . . .

The arrival rate estimation unit 13b calculates an arrival rate $P''_{up}(k)$ in the k-th repeated processing using a method similar to that in the first embodiment described above. The arrival rate estimation unit 13b repeatedly calculates the arrival rate while increasing base stations for which the calculation is performed, one by one until the repetition determination unit 14 determines to end the repeated processing. If the repetition determination unit 14 has determined to end the repeated processing, the arrival rate estimation unit 13b ends the repeated processing and outputs the calculated arrival rate $P''_{up}(k)$ at that point in time as an arrival rate at the position of the mesh for which calculation was performed.

The repetition determination unit 14 determines whether or not the arrival rate $P''_{up}(k)$ calculated in the k-th repeated processing satisfies the following Expression (12).

$$P''_{up}(k) \geq P_{target} \tag{12}$$

The repetition determination unit 14 determines to end the repeated processing if Expression (12) is satisfied or an amount of change from an arrival rate $P_{up}''(k-1)$ calculated in the (k−1)-th (immediately preceding) repeated processing satisfies the following Expression (13).

$$P''_{up}(k) - P''_{up}(k-1) \leq \Delta P_{target} \tag{13}$$

If the repetition determination unit 14 has determined to end the repeated processing, the arrival rate estimation unit 13b outputs the arrival rate $P''_{up}(k)$ calculated in the k-th repeated processing as an arrival rate at the position of the mesh for which calculation was performed.

[Operations of Arrival Rate Estimation Device]

The following describes operations of the arrival rate estimation device 1b in the arrival rate estimation processing.

Figure 8:
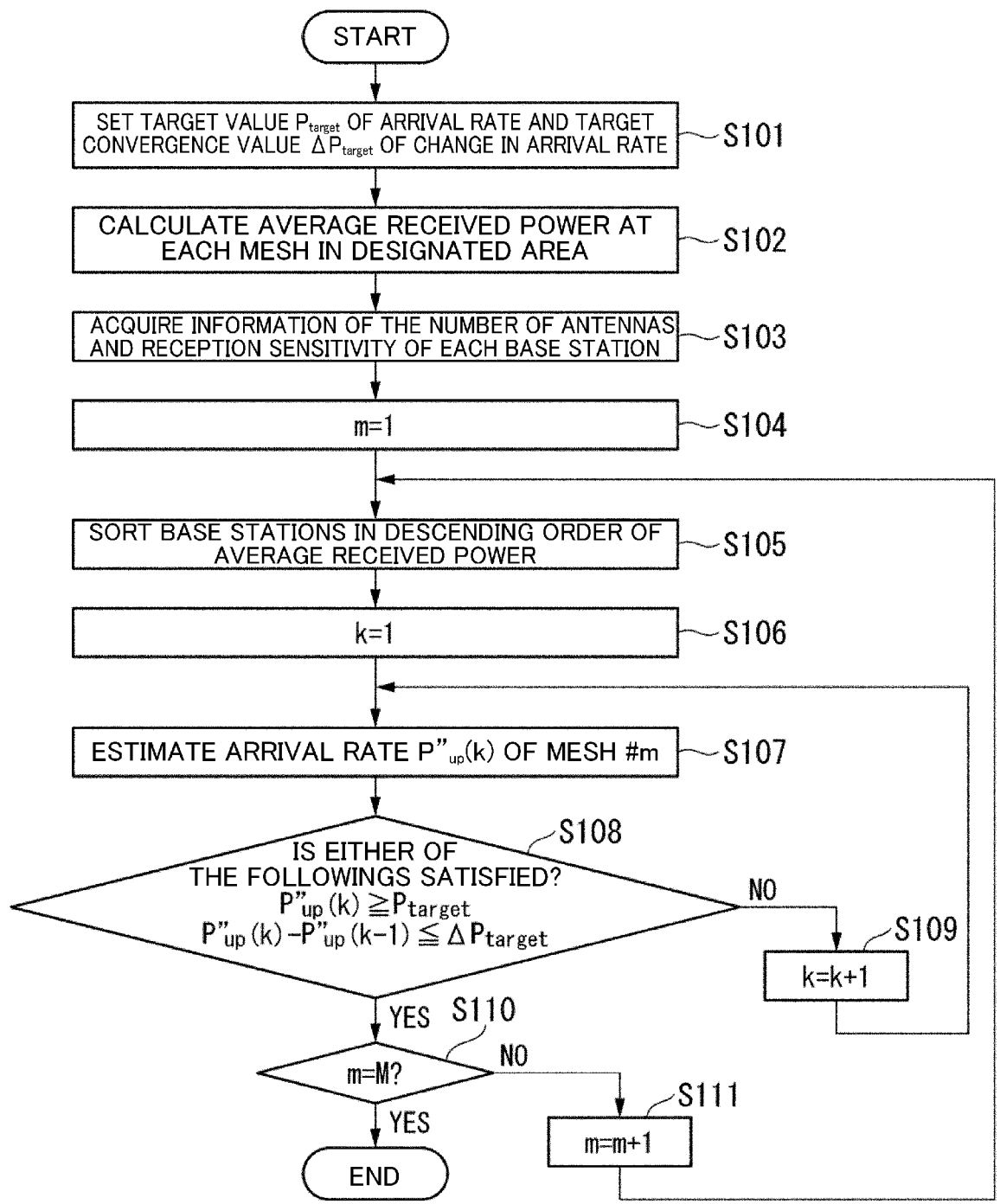
FIG. 8 is a flowchart showing operations of the arrival rate estimation device 1b according to the second embodiment of the present invention.

FIG. 8 is a flowchart showing the operations of the arrival rate estimation device 1b according to the second embodiment of the present invention.

First, a designer determines the target value $P_{target}$ of the arrival rate in station installation design and the target convergence value $\Delta P_{target}$ of changes in the arrival rate in the repeated processing. The determined values of $P_{target}$ and $\Delta P_{target}$ are set in the repetition determination unit 14 (step S101).

The average received power calculation unit 11 divides map data regarding an area designated by the designer into very small meshes. Here, the number of meshes is M. The average received power calculation unit 11 calculates an average received power at each base station with respect to each of the divided meshes (step S102).

The arrival rate estimation unit 13b acquires information indicating the number of antennas and the reception sensitivity of each base station from the radio equipment database (step S103).

1 is substituted for a variable m for identifying a mesh (step S104).

The arrival rate estimation unit 13b sorts the base stations in descending order of values of average received power with respect to the mesh #m (step S105).

1 is substituted for a variable k for identifying the number of times of execution of the repeated processing (step S106).

The arrival rate estimation unit 13b generates a CDF of the instantaneous received power value with respect to the mesh #m in a case where the influence of instantaneous changes due to Rayleigh fading is taken into consideration, by using the average received power with respect to the mesh #m.

Based on the CDF, the arrival rate estimation unit 13b calculates a probability of the instantaneous received power value being greater than or equal to the reception sensitivity of the base station. The arrival rate estimation unit 13b calculates an arrival rate while giving consideration to the antenna diversity effect and the site diversity effect of k base stations that are selected in descending order of average received power (step S107).

The arrival rate estimation unit 13b determines whether or not at least one of the above Expressions (11) and (12) is satisfied (step S108). If neither of Expressions (11) and (12) is satisfied (step S108—No), 1 is added to the variable k (step S109), and the arrival rate estimation device proceeds to step S107. On the other hand, if at least one of Expressions (11) and (12) is satisfied (step S108—Yes), the arrival rate estimation device ends calculation of the arrival rate at the mesh and proceeds to step S110.

Whether or not the variable m is equal to the number M of meshes is determined (step S110). If the variable m is not equal to the number M of meshes (step S110—No), 1 is added to the variable m (step S111), and the arrival rate estimation device proceeds to step S105. On the other hand, if the variable m is equal to the number M of meshes (step S110—Yes), the operations of the arrival rate estimation device 1b shown in the flowchart of FIG. 8 end.

As described above, the arrival rate estimation device 1b according to the second embodiment calculates an arrival rate while taking only base stations that greatly contribute to the arrival rate (i.e., base stations of which the average received power is high) to be targets of calculation, and therefore the arrival rate estimation device 1b can further reduce the calculation time it takes for the estimation of the arrival rate.

Third Embodiment

The following describes a third embodiment of the present invention.

In the first and second embodiments described above, cases have been described where an arrival rate is exactly calculated with respect to all meshes with consideration given to instantaneous changes due to Rayleigh fading and the diversity effects. In contrast, a case will be described in the third embodiment in which whether or not to exactly calculate an arrival rate is determined for each mesh in preliminary processing, and an arrival rate is exactly calculated only for meshes for which the exact calculation is necessary, with consideration given to instantaneous changes and the diversity effects. The following only describes differences from the first embodiment. Note that here, estimation of an arrival rate in upstream communication will be described.

[Configuration of Arrival Rate Estimation Device]

The following describes a functional configuration of an arrival rate estimation device 1c according to the present embodiment.

Figure 9:
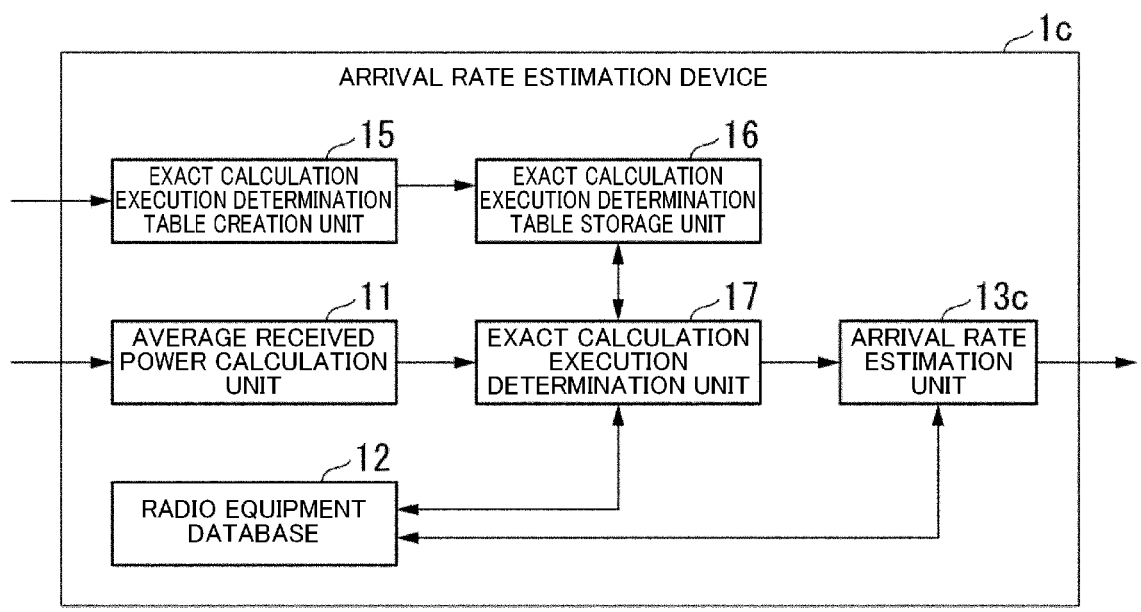
FIG. 9 is a block diagram showing a functional configuration of an arrival rate estimation device 1c according to a third embodiment of the present invention.

FIG. 9 is a block diagram showing the functional configuration of the arrival rate estimation device 1c according to the third embodiment of the present invention. As shown in FIG. 9, the arrival rate estimation device 1c includes the average received power calculation unit 11, the radio equipment database 12, an arrival rate estimation unit 13c, an exact calculation execution determination table creation unit 15, an exact calculation execution determination table storage unit 16, and an exact calculation execution determination unit 17. As described above, the functional configuration differs from that of the arrival rate estimation device 1a according to the first embodiment in that the exact calculation execution determination table creation unit 15, the exact calculation execution determination table storage unit 16, and the exact calculation execution determination unit 17 are provided.

In preliminary processing, the exact calculation execution determination table creation unit 15 calculates an arrival rate of a case where there are y base stations of which the average received power has a margin of x [dB] from the reception sensitivity. Then, the exact calculation execution determination table creation unit 15 creates an exact calculation execution determination table that is used to determine whether or not the exact calculation described above is necessary (the necessity of the exact calculation). The exact calculation execution determination table creation unit 15 sets information indicating "unnecessary" (i.e., indicating that the exact calculation described above is unnecessary) if the calculated arrival rate is greater than or equal to a target value $P_{target}$ of the arrival rate in station installation design, and sets information indicating "necessary" (i.e., indicating that the exact calculation described above is necessary) if the calculated arrival rate is smaller than the target value $P_{target}$ of the arrival rate in station installation design. The exact calculation execution determination table creation unit 15 stores the created exact calculation execution determination table in the exact calculation execution determination table storage unit 16.

The exact calculation execution determination unit 17 sorts values of average received power $R_{up}(i,j)$ that are calculated by the average received power calculation unit 11, in descending order. The exact calculation execution determination unit 17 outputs information indicating a result ("unnecessary" or "necessary") of determination as to whether or not the exact calculation described above is necessary to the arrival rate estimation unit 13c, based on values that are set in the exact calculation execution determination table and respective average received powers of base stations that are selected in descending order of values of average received power $R_{up}(i,j)$.

If information indicating "unnecessary" is output from the exact calculation execution determination unit 17, the arrival rate estimation unit 13c outputs the target value $P_{target}$ as the result of estimation of the arrival rate. If information indicating "necessary" is output from the exact calculation execution determination unit 17, the arrival rate estimation unit 13c performs exact calculation of an arrival rate using a method similar to that in the first or second embodiment described above, while giving consideration to instantaneous changes and the diversity effects.

[Arrival Rate Estimation]

The following describes processing for estimating an arrival rate of radio waves.

FIG. 10 is a diagram showing an example of the exact calculation execution determination table used by the arrival rate estimation device 1c according to the third embodiment of the present invention.

First, a designer determines the target value $P_{target}$ (e.g. 0.9) of the arrival rate in station installation design. The determined target value $P_{target}$ of the arrival rate is set in the exact calculation execution determination table creation unit 15.

In preliminary processing, the exact calculation execution determination table creation unit 15 calculates an arrival rate of a case where there are y base stations of which the average received power has a margin of x [dB] from the reception sensitivity. FIG. 10 shows an example in which the value of x is set at intervals of 5 dB and the number y of base stations is 1 to 4.

In a case where x=15 [dB] and y=3, for example, an arrival rate is calculated using a method similar to that in the first embodiment, with consideration given to instantaneous changes and the diversity effects, on the assumption that there are three base stations for which the following holds: the average received power=the reception sensitivity of the base station+15 [dB]. Here, assume that the calculated arrival rate is greater than or equal to the target value $P_{target}$. In this case, the exact calculation execution determination table creation unit 15 sets information indicating "unnecessary" in the exact calculation execution determination table.

In a case where x=5 [dB] and y=2, for example, an arrival rate is calculated using a method similar to that in the first embodiment, with consideration given to instantaneous changes and the diversity effects, on the assumption that there are two base stations for which the following holds: the average received power=the reception sensitivity of the base station+5 [dB]. Here, assume that the calculated arrival rate is smaller than the target value $P_{target}$. In this case, the exact calculation execution determination table creation unit 15 sets information indicating "necessary" in the exact calculation execution determination table. Through the procedure described above, the exact calculation execution determination table creation unit 15 creates the exact calculation execution determination table. Note that FIG. 10 shows an example of the exact calculation execution determination table that is created in a case where there are four base stations.

The exact calculation execution determination unit 17 sorts values of average received power $R_{up}(i,j)$ that are calculated by the average received power calculation unit 11, in descending order. Then, with respect to each value of average received power, the exact calculation execution determination unit 17 calculates a margin [dB] from the reception sensitivity of the base station.

For example, if the values of average received power $R_{up}(i,j)$ sorted in descending order respectively have margins of 18 [dB], 16 [dB], 4 [dB], and 3 [dB], there are two base stations for which the values of average received power $R_{up}(i,j)$ are 15 [dB] or more and less than 20 [dB]. Therefore, the exact calculation execution determination unit 17 reads information ("unnecessary") that is set in a cell corresponding to a case where x=15 [dB] and the number of base stations is two in the exact calculation execution determination table, and outputs the information to the arrival rate estimation unit 13c. When the information indicating "unnecessary" is output from the exact calculation execution determination unit, the arrival rate estimation unit 13c outputs the target value $P_{target}$ as the result of estimation of the arrival rate to an external device or the like.

Also, if the values of average received power $R_{up}(i,j)$ sorted in descending order respectively have margins of 18 [dB], 6 [dB], 4 [dB], and 3 [dB], for example, there is a base station for which the value of average received power $R_{up}(i,j)$ is 15 [dB] or more and less than 20 [dB]. Therefore, the exact calculation execution determination unit 17 reads information ("necessary") that is set in a cell corresponding to a case where x=15 [dB] and the number of base stations is one in the exact calculation execution determination table, and outputs the information to the arrival rate estimation unit 13c. When the information indicating "necessary" is output from the exact calculation execution determination unit, the arrival rate estimation unit 13c performs exact calculation of an arrival rate using a method similar to that in the first or second embodiment described above, while giving consideration to instantaneous changes and the diversity effects.

Note that if a determination is made focusing on the field where x=0 dB in the exact calculation execution determination table shown in FIG. 10, the result of determination is "unnecessary" since there are four base stations for which the margin is greater than or equal to 0 [dB]. There may be cases like this to which both "necessary" and "unnecessary" apply according to the exact calculation execution determination table. However, which of "necessary" and "unnecessary" is to be applied in such a case can be determined in advance following a design guideline.

If the design guideline indicates that exact calculation is to be performed for all uncertain meshes at the expense of a certain period time for the calculation, for example, the exact calculation execution determination unit 17 can output information indicating "necessary" to the arrival rate estimation unit 13c if the information indicating "necessary" is set for at least one of a plurality of applicable patterns, for example. To the contrary, if the design guideline indicates that priority is to be given to a reduction in the calculation time, the exact calculation execution determination unit 17 can perform processing as described below, for example. In this processing, the exact calculation execution determination unit 17 outputs information indicating "unnecessary" to the arrival rate estimation unit 13c if the information indicating "unnecessary" is set for at least one of a plurality of applicable patterns, and outputs information indicating "necessary" to the arrival rate estimation unit 13c only when the information indicating "necessary" is set for all the applicable patterns.

[Operations of Arrival Rate Estimation Device]

The following describes operations of the arrival rate estimation device 1c in arrival rate estimation processing.

Figure 11:
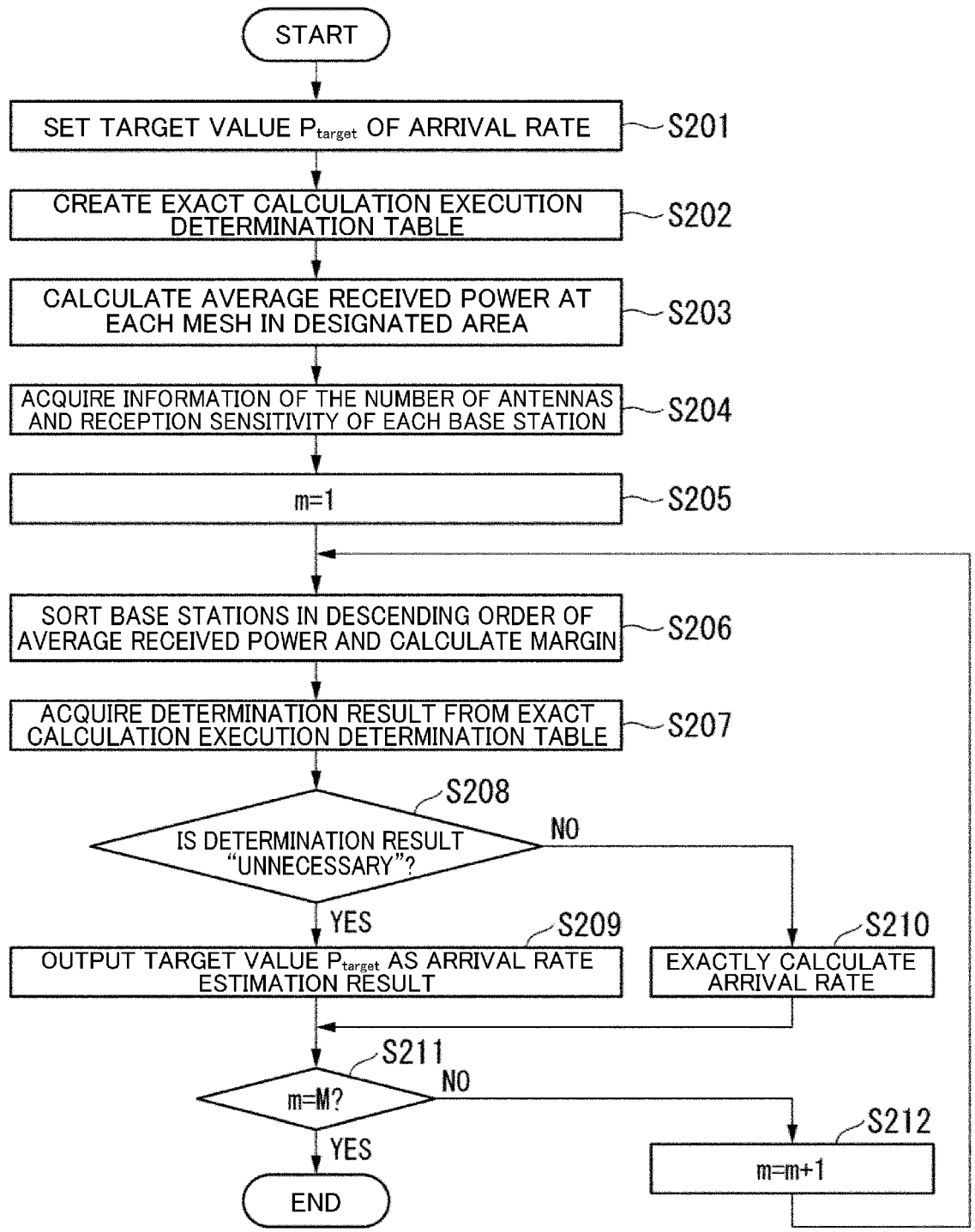
FIG. 11 is a flowchart showing operations of the arrival rate estimation device 1c according to the third embodiment of the present invention.

FIG. 11 is a flowchart showing the operations of the arrival rate estimation device 1c according to the third embodiment of the present invention.

First, a designer determines the target value $P_{target}$ of the arrival rate in station installation design. The determined target value $P_{target}$ is set in the exact calculation execution determination table creation unit 15 (step S201).

The exact calculation execution determination table creation unit 15 creates the exact calculation execution determination table through the procedure described above (step S202).

The average received power calculation unit 11 divides map data regarding an area designated by the designer into very small meshes. Here, the number of meshes is M. The average received power calculation unit 11 calculates an average received power at each base station with respect to each of the divided meshes (step S203).

The exact calculation execution determination unit 17 and the arrival rate estimation unit 13c acquire information indicating the number of antennas and the reception sensitivity of each base station from the radio equipment database 12 (step S204).

1 is substituted for a variable m for identifying a mesh (step S205).

The exact calculation execution determination unit 17 sorts base stations in descending order of values of average received power with respect to the mesh #m. Then, with respect to each value of average received power, the exact calculation execution determination unit 17 calculates a margin [dB] from the reception sensitivity of the base station (step S206). Then, the exact calculation execution determination unit 17 refers to the exact calculation execution determination table and acquires information (i.e., information indicating "necessary" or "unnecessary") indicating a result of determination as to whether or not the exact calculation described above is necessary, based on the calculated margins (step S207). The exact calculation execution determination unit 17 outputs the information indicating the result of determination to the arrival rate estimation unit 13c.

If the information indicating the result of determination as to whether or not the exact calculation is necessary is "unnecessary" (step S208—Yes), the arrival rate estimation unit 13c outputs the target value $P_{target}$ as the result of estimation of the arrival rate (step S209). On the other hand, if the information indicating the result of determination as to whether or not the exact calculation is necessary is "necessary" (step S208—No), the arrival rate estimation unit 13c performs exact calculation of an arrival rate using a method similar to that in the first or second embodiment described above, while giving consideration to instantaneous changes and the diversity effects (step S210).

Whether or not the variable m is equal to the number M of meshes is determined (step S211). If the variable m is not equal to the number M of meshes (step S211—No), 1 is added to the variable m (step S212), and the processing performed by the arrival rate estimation device 1c proceeds to step S206. On the other hand, if the variable m is equal to the number M of meshes (step S211—Yes), the operations of the arrival rate estimation device 1c shown in the flowchart of FIG. 11 end.

As described above, the arrival rate estimation device 1c according to the third embodiment determines whether or not an arrival rate needs to be exactly calculated for each mesh, in preliminary processing. With respect to only meshes for which it is determined that the arrival rate needs to be exactly calculated, the arrival rate estimation device 1c performs exact calculation of the arrival rate while giving consideration to instantaneous changes and the diversity effects. Therefore, the arrival rate estimation device 1c according to the third embodiment can further reduce the calculation time it takes for the estimation of the arrival rate.

Fourth Embodiment

The following describes a fourth embodiment of the present invention.

In the first and second embodiments described above, cases have been described where exact calculation of an arrival rate is performed with respect to all meshes with consideration given to instantaneous changes due to Rayleigh fading and the diversity effects. In contrast, a case will be described in the fourth embodiment in which values of average received power are compared between adjacent meshes with respect to higher-order base stations, and if the difference is small, the adjacent meshes are grouped, and an arrival rate is exactly calculated only for a representative mesh with consideration given to instantaneous changes and the diversity effects. The following only describes differences from the first embodiment. Note that here, estimation of an arrival rate in upstream communication will be described.

[Configuration of Arrival Rate Estimation Device]

The following describes a functional configuration of an arrival rate estimation device 1d according to the present embodiment.

Figure 12:
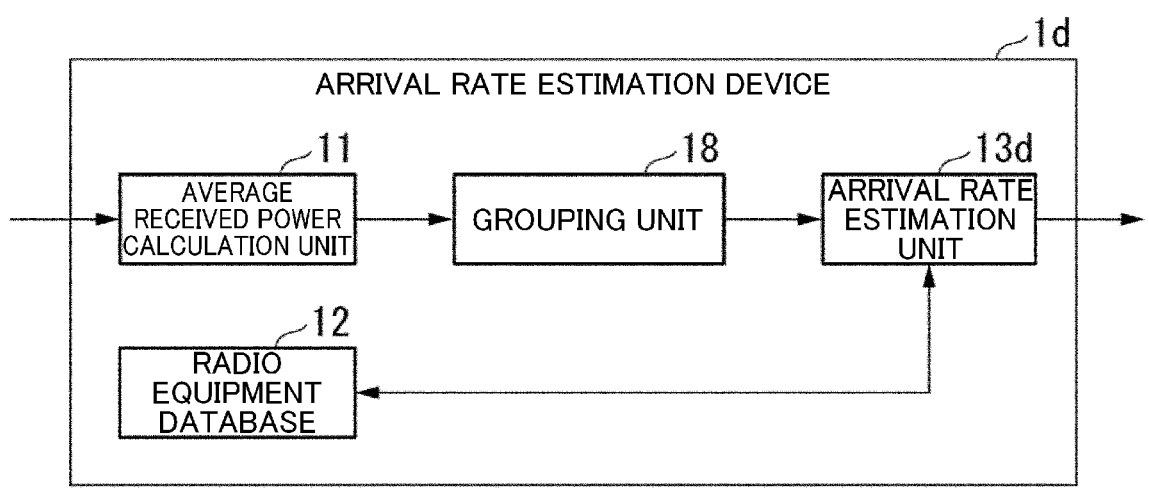
FIG. 12 is a block diagram showing a functional configuration of an arrival rate estimation device 1d according to a fourth embodiment of the present invention.

FIG. 12 is a block diagram showing the functional configuration of the arrival rate estimation device 1d according to the fourth embodiment of the present invention. As shown in FIG. 12, the arrival rate estimation device 1d includes the average received power calculation unit 11, the radio equipment database 12, an arrival rate estimation unit 13d, and a grouping unit 18. As described above, the functional configuration differs from that of the arrival rate estimation device 1a according to the first embodiment in that the grouping unit 18 is provided.

The grouping unit 18 sorts base stations in descending order of values of average received power that are calculated by the average received power calculation unit 11. The grouping unit 18 compares the average received power of each of a predetermined number of higher-order base stations and an average received power of the same base station that is calculated for an adjacent mesh, and if the difference is small, groups these meshes.

The arrival rate estimation unit 13d performs exact calculation of an arrival rate with respect to a representative mesh of the grouped meshes, using a method similar to that in the first or second embodiment described above, while giving consideration to instantaneous changes and the diversity effects. Then, the arrival rate estimation unit 13d applies the result of calculation performed with respect to the representative mesh to another mesh of the grouped meshes (i.e., the arrival rate with respect to the other mesh of the grouped meshes is taken to be the same as the arrival rate calculated with respect to the representative mesh).

Note that the representative mesh is preferably located at the center of a target range as far as possible. For example, if nine meshes constituted by 3×3 meshes arranged in lateral and longitudinal directions are grouped, a mesh that is located at the center is preferably selected as the representative mesh.

[Operations of Arrival Rate Estimation Device]

The following describes operations of the arrival rate estimation device 1d in arrival rate estimation processing.

Figure 13:
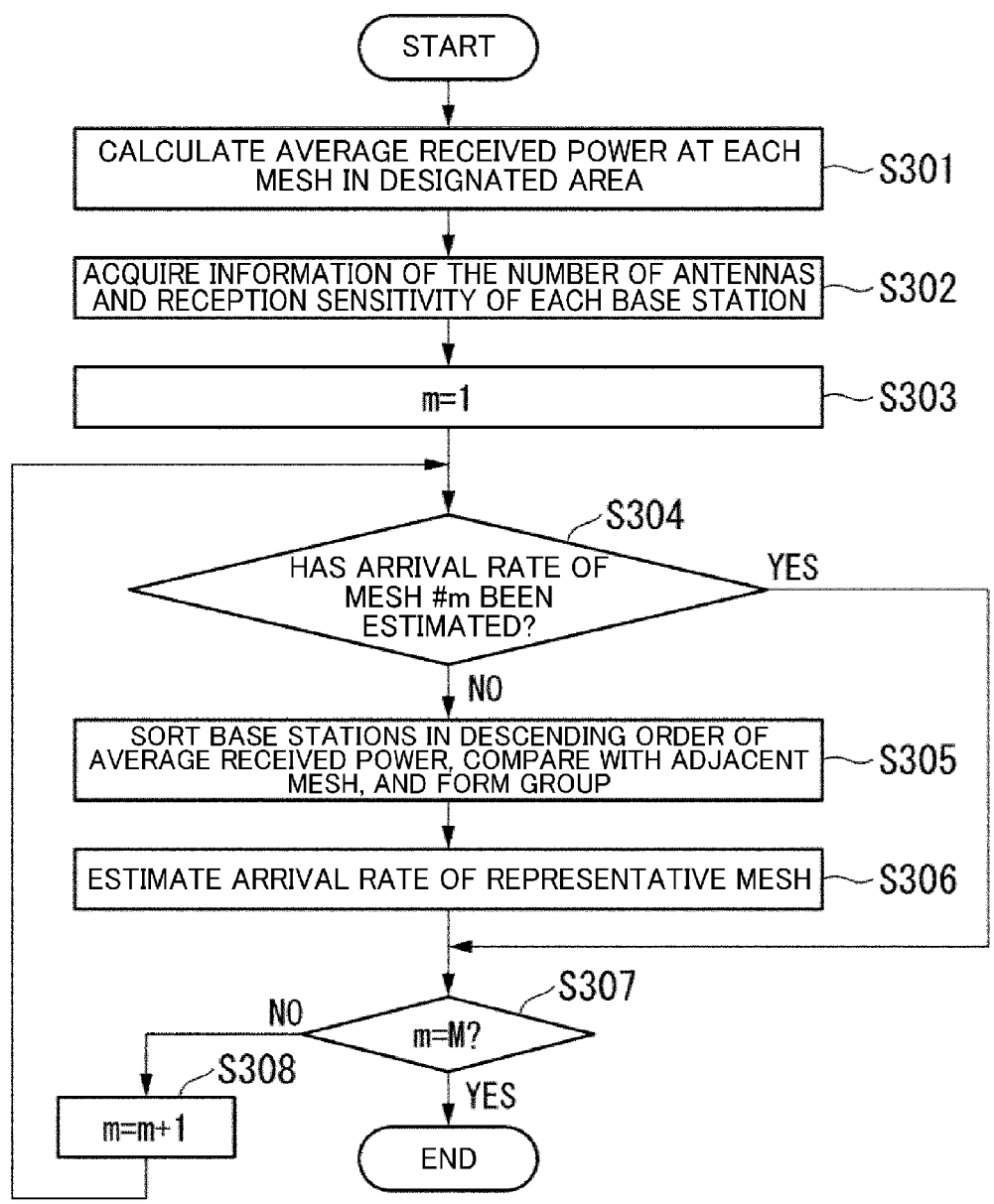
FIG. 13 is a flowchart showing operations of the arrival rate estimation device 1d according to the fourth embodiment of the present invention.

FIG. 13 is a flowchart showing the operations of the arrival rate estimation device 1d according to the fourth embodiment of the present invention.

The average received power calculation unit 11 divides map data regarding an area designated by a designer into very small meshes. Here, the number of meshes is M. The average received power calculation unit 11 calculates an average received power at each base station with respect to each of the divided meshes (step S301).

The arrival rate estimation unit 13d acquires information indicating the number of antennas and the reception sensitivity of each base station from the radio equipment database (step S302).

1 is substituted for a variable m for identifying a mesh (step S303).

Whether or not an arrival rate of the mesh #m has been estimated (i.e., whether or not the mesh #m has been grouped) is determined (step S304). If the arrival rate of the mesh #m has been estimated (step S304—Yes), the processing performed by the arrival rate estimation device 1d proceeds to step S307.

On the other hand, if the arrival rate of the mesh #m has not been estimated (step S304—No), the grouping unit 18 generates a group including the mesh #m. Then, with respect to a mesh that has not yet been grouped out of adjacent meshes that are adjacent to the group and the mesh #m, the grouping unit 18 sorts base stations in descending order of values of average received power calculated by the average received power calculation unit 11 and acquires the values of average received power of a predetermined number of higher-order base stations.

The grouping unit 18 groups meshes by repeating processing for including an adjacent mesh in the group if a difference between average received powers of the same base station that are respectively calculated for the adjacent mesh and each mesh in the group is small (step S305). Note that an example of the case where the difference between average received powers of the same base station that are respectively calculated for the adjacent mesh and each mesh in the group is small is a case where, with respect to average received power of each target base station, the average received power calculated for the adjacent mesh has a difference not larger than a predetermined value from both the largest value and the smallest value of values of average received power calculated for meshes in the group.

The arrival rate estimation unit 13d performs exact calculation of an arrival rate for a representative mesh of the grouped meshes, using a method similar to that in the first or second embodiment described above, while giving consideration to instantaneous changes and the diversity effects (step S306).

Whether or not the variable m is equal to the number M of meshes is determined (step S307). If the variable m is not equal to the number M of meshes (step S307—No), 1 is added to the variable m (step S308), and the processing performed by the arrival rate estimation device 1d proceeds to step S304. On the other hand, if the variable m is equal to the number M of meshes (step S307—Yes), the operations of the arrival rate estimation device 1d shown in the flowchart of FIG. 12 end.

As described above, the arrival rate estimation device 1d according to the fourth embodiment groups a plurality of meshes if average received powers of higher-order base stations calculated for the respective meshes are close. Then, the arrival rate estimation device 1d performs exact calculation of an arrival rate only for a representative mesh of the grouped meshes while giving consideration to instantaneous changes and the diversity effects. The arrival rate estimation device 1d applies the result of calculation performed with respect to the representative mesh to the other meshes of the grouped meshes. Thus, the arrival rate estimation device 1d according to the fourth embodiment can further reduce the calculation time it takes for the estimation of the arrival rate.

A portion or the entirety of the arrival rate estimation devices 1a to 1d according to the embodiments described above may also be implemented using a computer. In this case, a program for implementing functions may also be recorded in a computer-readable recording medium, and may also be implemented by causing a computer system to read and execute the program recorded in the recording medium. Note that the "computer system" referred to herein includes an OS and hardware such as peripheral devices. Also, the "computer-readable recording medium" refers to a portable medium such as a flexible disk, a magneto-optical disk, a ROM, or a CD-ROM, or a storage device such as a hard disk that is built in the computer system. Furthermore, the "computer-readable recording medium" may include recording mediums that dynamically hold the program for a short period of time such as a communication line in a case where the program is transmitted via a network such as the Internet or a communication line such as a telephone line, and recording mediums that hold the program for a certain period of time such as a volatile memory in a computer system that serves as a server or a client in that case. Also, the program described above may also be a program for implementing some of the functions described above, a program that can implement the functions described above in combination with a program that is already recorded in the computer system, or a program that is implemented using hardware such as a PLD (Programmable Logic Device) or an FPGA (Field Programmable Gate Array).

Although the embodiments of the present invention have been described with reference to the drawings, it is clear that the embodiments described above are merely examples of the present invention and the present invention is not limited to the embodiments described above. Therefore, constitutional elements may be added, omitted, or replaced, and other changes may be made within a scope not departing from the technical idea and the gist of the present invention.

REFERENCE SIGNS LIST 1a-1d Arrival rate estimation device
11 Average received power calculation unit
12 Radio equipment database
13a-13d Arrival rate estimation unit
14 Determination unit
15 Exact calculation execution determination table creation unit
16 Exact calculation execution determination table storage unit
17 Exact calculation execution determination unit
18 Grouping unit

The invention claimed is:

1. An arrival rate estimation device comprising:
a processor; and
a storage medium having computer program instructions stored thereon, when executed by the processor, perform to:
calculate an average received power for each mesh that constitutes an area, with respect to each of a plurality of base stations and each of a plurality of antennas that are included in each of the base stations; and calculate a communication arrival rate by substituting the average received power into a cumulative distribution function of an instantaneous received power value, and based on the calculated communication arrival rate, calculate a communication arrival rate while giving consideration to a site diversity effect and an antenna diversity effect, the cumulative distribution function being obtained from a probability density function of an amplitude that instantaneously changes due to Rayleigh fading.

2. The arrival rate estimation device according to claim 1, wherein the computer program instructions further perform to calculates an influence of instantaneous changes in received power using an analytic expression.

3. The arrival rate estimation device according to claim 1, wherein the computer program instructions further perform to calculates an average received power of upstream communication and an average received power of downstream communication, and calculates a joint probability of an arrival rate in upstream communication and an arrival rate in downstream communication.

4. The arrival rate estimation device according to claim 1, further comprising: a repetition determination unit, wherein the computer program instructions further perform to sorts the base stations in descending order of calculated values of average received power, repeatedly calculates an arrival rate while gradually increasing the number of base stations that are taken into consideration, in descending order of power, and ends repeated processing if a calculated arrival rate is greater than or equal to a target value or a change from an arrival rate that has been calculated in immediately preceding repeated processing is no greater than a target convergence value.

5. The arrival rate estimation device according to claim 1, further comprising: wherein the computer program instructions further perform to sorts the base stations in descending order of calculated values of average received power, creates an exact calculation execution determination table for determining whether or not exact calculation of an arrival rate needs to be performed, based on average received powers and the number of base stations, and refers to the exact calculation execution determination table to determine whether or not exact calculation needs to be performed.

6. The arrival rate estimation device according to claim 1, wherein the computer program instructions further perform to sorts the base stations in descending order of calculated values of average received power, groups adjacent meshes if a difference between the adjacent meshes in average received power of higher-order base stations is small, and calculates an arrival rate for a mesh of the grouped meshes while giving consideration to an influence of instantaneous changes and diversity effects, and takes the calculated arrival rate to be an arrival rate with respect to another mesh of the grouped meshes.

7. An arrival rate estimation method comprising: an average received power calculation step of calculating an average received power for each mesh that constitutes an area, with respect to each of a plurality of base stations and each of a plurality of antennas that are included in each of the base stations; and an arrival rate estimation step of calculating a communication arrival rate by substituting the average received power into a cumulative distribution function of an instantaneous received power value, and based on the calculated communication arrival rate, calculating a communication arrival rate while giving consideration to a site diversity effect and an antenna diversity effect, the cumulative distribution function being obtained from a probability density function of an amplitude that instantaneously changes due to Rayleigh fading.

8. A non-transitory computer-readable medium having computer-executable instructions that, upon execution of the instructions by a processor of a computer, cause the computer to perform
calculate an average received power for each mesh that constitutes an area, with respect to each of a plurality of base stations and each of a plurality of antennas that are included in each of the base stations; and calculate a communication arrival rate by substituting the average received power into a cumulative distribution function of an instantaneous received power value, and based on the calculated communication arrival rate, calculate a communication arrival rate while giving consideration to a site diversity effect and an antenna diversity effect, the cumulative distribution function being obtained from a probability density function of an amplitude that instantaneously changes due to Rayleigh fading.

* * * * *